(12) United States Patent
Bajekal et al.

(10) Patent No.: US 8,482,434 B2
(45) Date of Patent: Jul. 9, 2013

(54) WIRELESS SENSOR FOR AN AIRCRAFT PROPULSION SYSTEM

(75) Inventors: Sanjay Bajekal, Simsbury, CT (US); Peter G. Smith, Wallingford, CT (US); Vijaya Ramaraju Lakamraju, Longmeadow, MA (US); Nicholas C. Soldner, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 362 days.

(21) Appl. No.: 12/884,803

(22) Filed: Sep. 17, 2010

(65) Prior Publication Data

US 2012/0068003 A1    Mar. 22, 2012

(51) Int. Cl.
   *G08B 21/00*   (2006.01)
(52) U.S. Cl.
   USPC .................. 340/945; 340/870.01; 340/539.26
(58) Field of Classification Search
   USPC .............. 340/945, 870.01, 870.3, 870.31, 340/870.32, 870.35, 870.36, 539.26, 870.16
   See application file for complete search history.

(56) References Cited

U.S. PATENT DOCUMENTS

| | | | | |
|---|---|---|---|---|
| 4,982,156 A | * | 1/1991 | Lewis et al. | 324/207.18 |
| 5,235,274 A | * | 8/1993 | Frazzini et al. | 324/207.12 |
| 5,781,007 A | * | 7/1998 | Partika et al. | 324/220 |
| 6,368,089 B1 | * | 4/2002 | Frolik | 418/92 |
| 6,535,133 B2 | | 3/2003 | Gohara | |
| 7,256,695 B2 | | 8/2007 | Hamel et al. | |
| 7,434,405 B2 | * | 10/2008 | Gukeisen et al. | 60/785 |
| 7,514,804 B2 | | 4/2009 | Wang | |
| 7,616,682 B2 | * | 11/2009 | Small | 375/220 |
| 7,649,283 B2 | | 1/2010 | Tonn et al. | |
| 7,671,736 B2 | | 3/2010 | Iverson et al. | |
| 2007/0139193 A1 | * | 6/2007 | Arik et al. | 340/539.26 |
| 2009/0097967 A1 | | 4/2009 | Smith et al. | |

FOREIGN PATENT DOCUMENTS

WO    2004069076    8/2004

OTHER PUBLICATIONS

Kurs et al. "Wireless Power Transfer via Strongly Coupled Magnetic Resonances", Science, vol. 317, Jul. 6, 2007, pp. 83-86.

* cited by examiner

*Primary Examiner* — Daniel Previl
(74) *Attorney, Agent, or Firm* — O'Shea Getz P.C.

(57) ABSTRACT

A method is provided for wirelessly monitoring an aircraft propulsion system having a plurality of rotor blades, at least some of which rotor blades have an internal compartment. The method includes: providing a primary transducer having a primary coil, and one or more secondary transducers, each secondary transducer having a secondary coil connected to a sensor, wherein the secondary transducers are respectively disposed within the internal compartments; wirelessly powering the secondary transducers using a magnetic field generated by the primary transducer; monitoring at least one operational parameter from within each internal compartment using a respective sensor; and transmitting output signals from the secondary transducers to the primary transducer through the magnetic field, wherein the output signals are indicative of the monitored parameters.

21 Claims, 3 Drawing Sheets

WIRELESS SENSOR FOR AN AIRCRAFT PROPULSION SYSTEM

BACKGROUND OF THE INVENTION

1. Technical Field

This disclosure relates generally to a system and method for wirelessly monitoring an aircraft propulsion system.

2. Background Information

A typical aircraft propulsion system includes multiple complex components and systems. To facilitate optimal operation of such a propulsion system, sensors are used to monitor various engine parameters. Data associated with these parameters can be processed in order to maximize engine performance, increase fuel efficiency, reduce engine degradation and/or schedule engine maintenance.

Recent advances in material technologies have enabled the manufacture of complex hollow blades for various aircraft propulsion systems. A typical hollow blade includes one or more sealed internal compartments. Each sealed compartment is typically evacuated, or filled with inert gas. Such hollow blades can increase engine performance and efficiency by, for example, reducing engine weight. Disadvantageously, however, hollow blades may also be more prone to damage.

There is a need in the art, therefore, for a wireless monitoring system that can monitor one or more parameters of a hollow blade in order to reduce or prevent blade damage.

SUMMARY OF THE DISCLOSURE

According to a first aspect of the invention, a gas turbine engine is provided that includes a rotor stage, an enclosure, a primary transducer and at least one secondary transducer. The rotor stage includes a plurality of rotors. At least one of the rotors includes a blade with an internal compartment. The enclosure is disposed circumferentially around the rotor stage. The primary transducer has a primary coil disposed with the enclosure. The secondary transducer has a secondary coil connected to a sensor. The secondary transducer is disposed within the internal compartment of the blade. The primary transducer is operable to wirelessly transfer power to the secondary transducer. The secondary transducer is operable to wirelessly transfer sensor data to the primary transducer.

According to a second aspect of the invention, a rotary wing aircraft is provided that includes an enclosure, a mast, a primary transducer and at least one secondary transducer. The mast extends from the enclosure to a plurality of rotors. At least one of the rotors has a blade with an internal compartment. The primary transducer has a primary coil disposed with the enclosure. The secondary transducer has a secondary coil connected to a sensor. The secondary transducer is disposed within the internal compartment of the blade. The primary transducer is operable to wirelessly transfer power to the secondary transducer. The secondary transducer is operable to wirelessly transfer sensor data to the primary transducer.

According to a third aspect of the invention, a method is provided for wirelessly monitoring an aircraft propulsion system. The method includes: (a) providing a plurality of rotor blades for the aircraft propulsion system, at least some of which rotor blades have an internal compartment; (b) providing a primary transducer having a primary coil, and a plurality of secondary transducers, each secondary transducer having a secondary coil connected to a sensor, wherein the secondary transducers are respectively disposed within the internal compartments; (c) wirelessly powering the secondary transducers using a magnetic field generated by the primary transducer; (d) monitoring at least one operational parameter from within each internal compartment using a respective sensor; (e) transmitting a synchronization signal from the primary transducer to the secondary transducers through the magnetic field; and (f) transmitting output signals from the secondary transducers to the primary transducer through the magnetic field as a function of the synchronization signal, wherein the output signals are indicative of the monitored parameters.

The foregoing features and the operation of the invention will become more apparent in light of the following description and the accompanying drawings.

DETAILED DESCRIPTION OF THE INVENTION

The present invention includes a method and system for wirelessly monitoring an aircraft propulsion system. At least one component of the aircraft propulsion system can be monitored, for example, by configuring a wireless monitoring system, having a primary transducer and at least one secondary transducer, with the aircraft propulsion system. The secondary transducer is wirelessly powered by a magnetic field generated by the primary transducer. A sensor, included in the secondary transducer, monitors at least one operational parameter of the aircraft propulsion system component. The secondary transducer wirelessly transmits an output signal, indicative of the monitored parameter, to the primary transducer through the magnetic field. The primary transducer can then generate sensor data from the received output signal for use in high-level control. Examples of each system and component used in this method will be described below in further detail.

Figure 1:
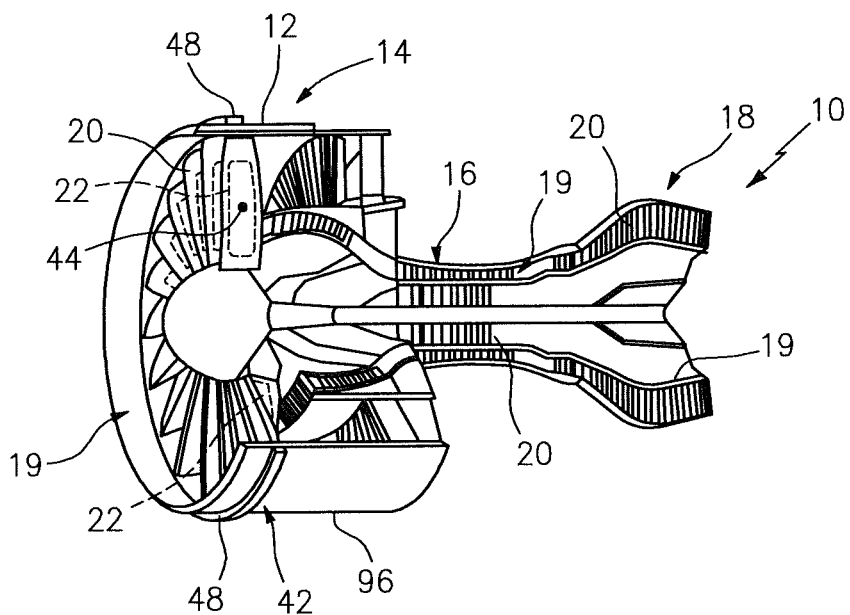
FIG. 1 is a cutaway diagrammatic illustration of a gas turbine engine disposed with a wireless monitoring system.
Figure 2:
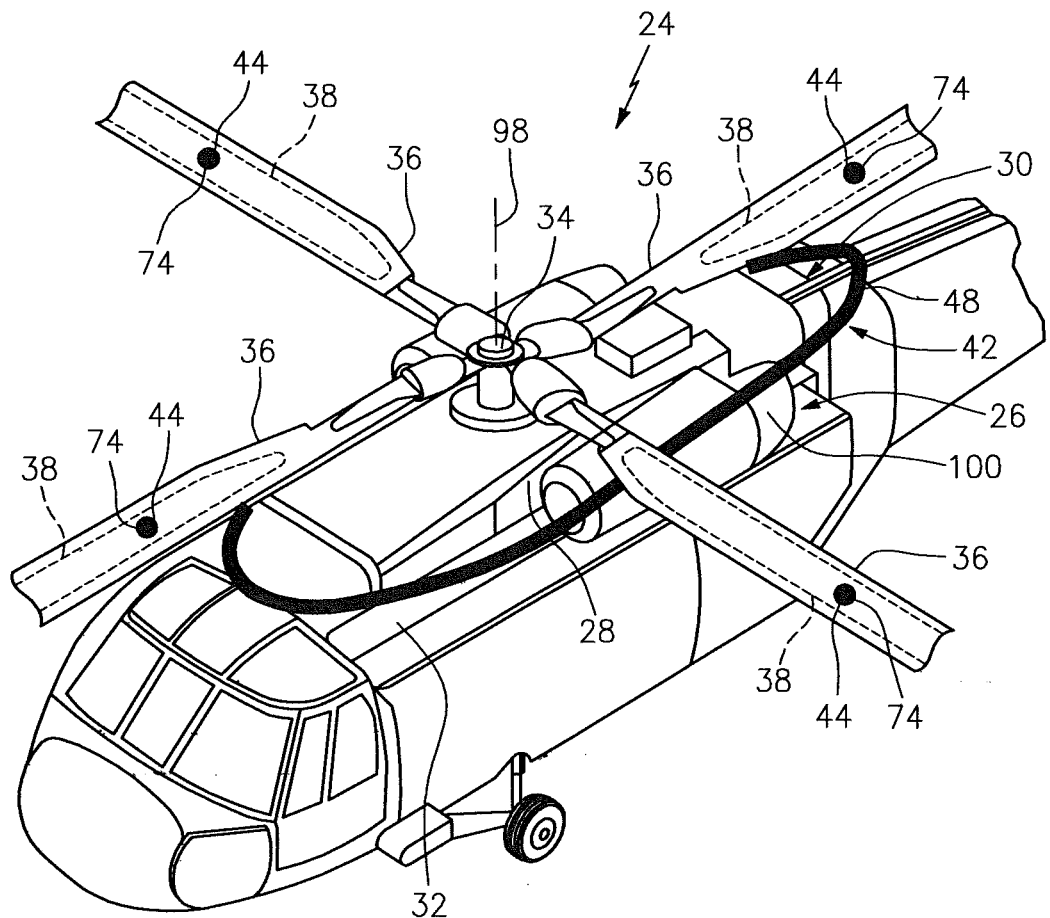
FIG. 2 is a diagrammatic illustration of a propulsion system for a rotary wing aircraft disposed with a wireless monitoring system.

Referring to FIGS. 1 and 2, two embodiments of an aircraft propulsion system are shown configured with a wireless monitoring system for performing the aforesaid method. In the embodiment shown in FIG. 1, the aircraft propulsion system is configured as a gas turbine engine 10. The gas turbine engine 10 includes an enclosure 12 (e.g., an engine case or nacelle) disposed circumferentially around a fan section 14, a compressor section 16 and/or a turbine section 18. In the specific embodiment shown in FIG. 1, for example, the enclosure 12—configured as a fan case—is disposed circumferentially around the fan section 14 of the engine 10. Each engine section 14, 16, 18 includes at least one rotor stage 19 having a plurality of rotors. Each rotor includes a blade 20 (or airfoil). One or more of the blades 20 in at least one of the rotor stages 14, 16, 18 has an internal compartment 22.

In the embodiment shown in FIG. 2, the aircraft propulsion system is configured for a rotary wing aircraft 24 (or helicopter). The propulsion system includes an engine 26 and a transmission 28 disposed between an engine cowling 30 and a cabin ceiling 32. The transmission 28 is connected to a mast 34 that extends out of the engine cowling 30 to a plurality of rotors. Each rotor includes a blade 36 (or airfoil). One or more of the blades 36 has an internal compartment 38.

Figure 3:
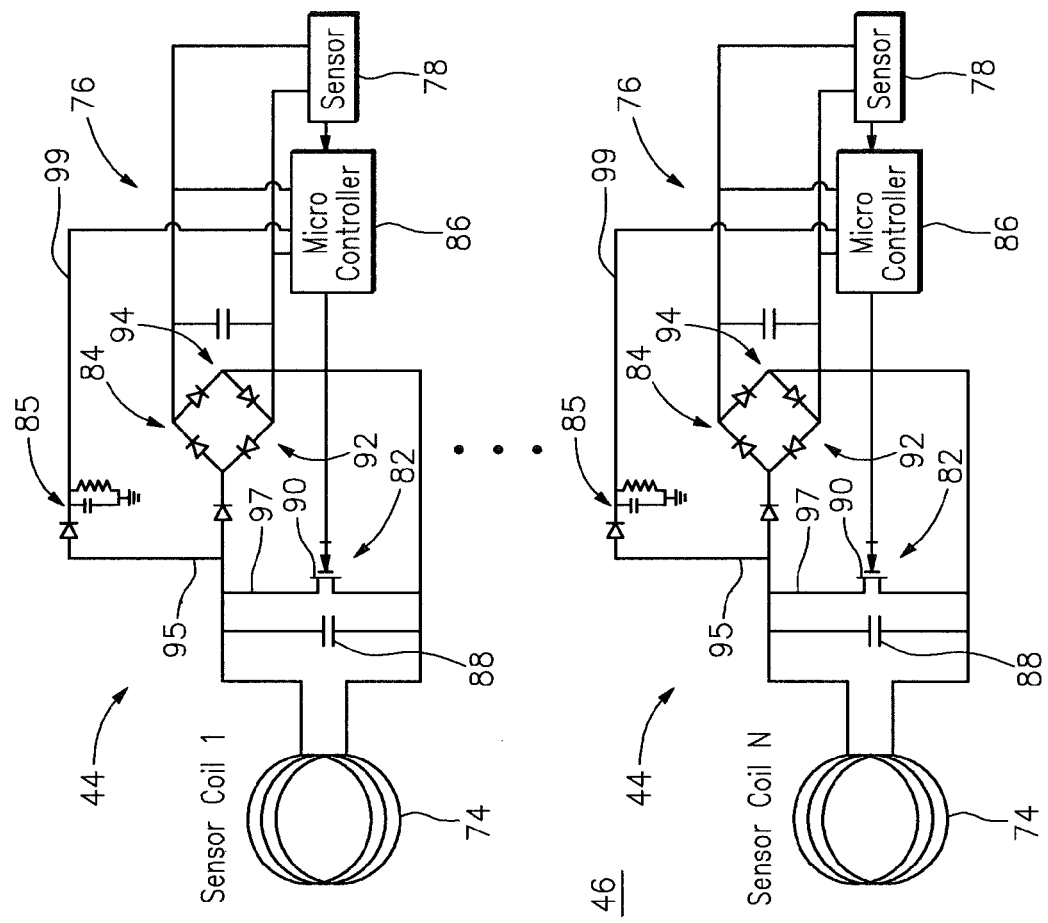
FIG. 3 is a schematic illustration of an embodiment of a wireless monitoring system.
Figure 3:
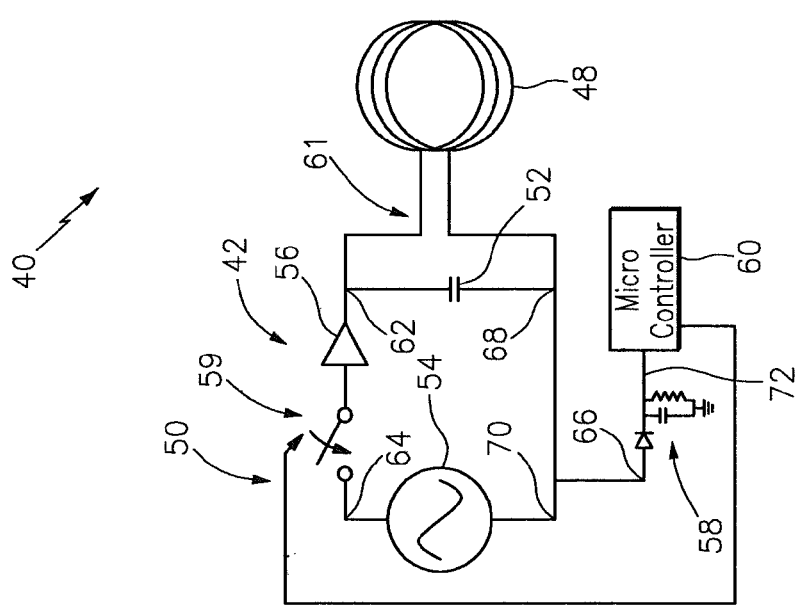

Referring to FIG. 3, an embodiment of the wireless monitoring system 40 ("monitoring system") is shown. The monitoring system 40 includes a primary transducer 42 ("base transducer") and one or more secondary transducers 44 ("sensor transducer"). The term "transducer" is used here to describe a device that can both transmit and receive signals.

The base transducer 42 is adapted to generate a magnetic field 46, and to transmit one or more control signals through the magnetic field 46. The control signals include a sensor wakeup signal ("wakeup signal") and, optionally, a synchronization signal ("synch signal"). The base transducer 42 is further adapted to receive at least one sensor transducer output signal through the magnetic field 46, and to provide sensor data by processing the sensor transducer output signal. The base transducer 42 includes at least one primary coil 48 (or antenna), and a primary signal generation and processing system 50 ("base processing system").

The primary coil 48 has a resonant frequency. The primary coil 48 is further adapted to (i) generate the magnetic field 46, (ii) transmit the control signals, and (iii) receive the sensor transducer output signals. In embodiments where the base transducer 42 includes more than one primary coil (not shown), however, a first one of the primary coils can be adapted to generate the magnetic field 46 and to transmit the control signals, and a second one of the primary coils can be adapted to receive the sensor transducer output signal. Referring again to the embodiment shown in FIG. 3, the primary coil 48 includes a length of helically wound, electrically conductive wire. The present invention, however, is not limited to the aforesaid helical wire configuration.

The base processing system 50 includes hardware and/or software configured to (i) generate the control signals, and (ii) process (e.g., amplify, demodulate, etc.) the sensor transducer output signals to provide the sensor data. In the specific embodiment shown in FIG. 3, for example, the base processing system 50 includes a capacitor 52, an oscillator 54, an amplifier 56, an envelope detector 58, a modulator 59, and a microcontroller 60. The modulator 59 can be configured as a two-way switch (as shown), or any other suitable physical layer modulation circuit. The capacitor 52 and the primary coil 48 are connected in parallel forming an inductive-capacitance circuit 61 (or "tank circuit"). The inductive-capacitance circuit 61 is connected in parallel to the oscillator 54. The amplifier 56 and the modulator 59 are connected serially between a first end 62 of the capacitor 52 and a first end 64 of the oscillator 54. A first end 66 of the envelope detector 58 is connected in parallel to a second end 68 of the capacitor 52 and a second end 70 of the oscillator 54. The microcontroller 60 is connected serially to a second end 72 of the envelope detector 58. The microcontroller 60 is also connected to the modulator 59. The present invention, however, in not limited to the aforedescribed example. Rather, the base processing system 50 is designed depending on the specific application and system requirements.

Each sensor transducer 44 is adapted to receive power from the magnetic field 46, and to receive the control signals. Each sensor transducer 44 is further adapted to monitor at least one operational engine parameter (e.g., strain, pressure, temperature, etc.), and to generate the sensor transducer output signal as a function of the monitored parameter. Each sensor transducer 44 includes a secondary coil 74 (or antenna), a secondary signal generation and processing system 76 ("sensor processing system"), at least one sensor 78 and, optionally, a power storage device 80. Examples of suitable sensors include, but are not limited to, strain sensors, pressure sensors, temperature sensors, etc. Examples of suitable power storage devices include, but are not limited to, capacitors, miniature batteries, etc.

The secondary coil 74 has a resonant frequency substantially equal to the resonant frequency of the primary coil 48. The secondary coil 74 is further adapted to (i) receive the control signals, and (ii) transmit the sensor transducer output signal. In the embodiment shown in FIG. 3, the primary coil 48 includes a length of helically wound, electrically conductive wire. The present invention, however, is not limited to the aforesaid helical wire configuration. In an alternate embodiment (not shown), for example, the secondary coil 74 can include a planar coil pattern disposed on a printed circuit board. A suitable example of such a planar coil is disclosed in U.S. Pat. No. 7,649,283 to Tonn et al., which is hereby incorporated by reference in its entirety.

The sensor processing system 76 includes hardware and/or software configured to generate the sensor transducer output signal by processing a sensor output signal. Referring to the specific embodiment shown in FIG. 3, for example, the sensor processing system 76 includes a load modulation circuit 82, a rectifier 84, an envelope detector 85, and a microcontroller 86. The load modulation circuit 82 includes a capacitor 88 connected in parallel with a transistor 90. The load modulation circuit 82 is connected in parallel between the secondary coil 74 and a first end 92 of the rectifier 84. The power storage device 80, the microcontroller 86 and the sensor 78 are connected in parallel to a second end 94 of the rectifier 84. A first end 95 of the envelope detector 85 is connected in parallel to a first end 97 of the transistor 90 and the first end 92 of the rectifier 84. A second end 99 of the envelope detector 85 is connected to the microcontroller 86. The microcontroller 86 is also connected to the sensor 78 and to a gate of the transistor 90. The present invention, however, in not limited to the aforedescribed example. Rather, the sensor processing system 76 is designed depending on the specific application and system requirements.

Referring again to the embodiment shown in FIG. 1, the primary coil 48 is configured to extend circumferentially around the fan section 14 of the gas turbine engine 10. The primary coil 48 can be attached to an outer surface 96 of, or embedded within the fan case 12. The sensor transducers 44 are respectively disposed in the internal compartments 22 of the fan blades 20 in the gas turbine engine 10.

Referring now to the embodiment shown in FIG. 2, the primary coil 48 is configured to extend circumferentially around a rotational axis 98 of the mast 34. In some embodiments, the primary coil 48 circumferentially extends proximate an outer edge 100 of an enclosure such as the cabin ceiling 32 or the engine cowling 30. The primary coil 48 can be attached to, or embedded within the cabin ceiling 32 or the engine cowling 30. Alternately, the primary coil 48 can be affixed between the engine cowling 30 and the cabin ceiling 32. The sensor transducers 44 are respectively disposed in the internal compartments 38 of the rotor blades 36.

The following describes an embodiment of a method for wirelessly monitoring the aircraft propulsion systems shown in FIGS. 1 and 2. In order to monitor one or more parameters (e.g., temperature, pressure, strain, etc.) from within one or more of the internal blade compartments 22, 38, the base transducer 42 provides the wakeup signal to one or more of the sensor transducers 44. The wakeup signal is generated by producing a carrier signal with a first frequency using the oscillator 54. The carrier signal energizes the primary coil 48, thereby generating the magnetic field 46. The primary coil 48 transmits the carrier signal through the magnetic field 46 by converting the carrier signal from an electrical signal to a magnetic signal by modulating the magnetic field 46.

Figure 4:
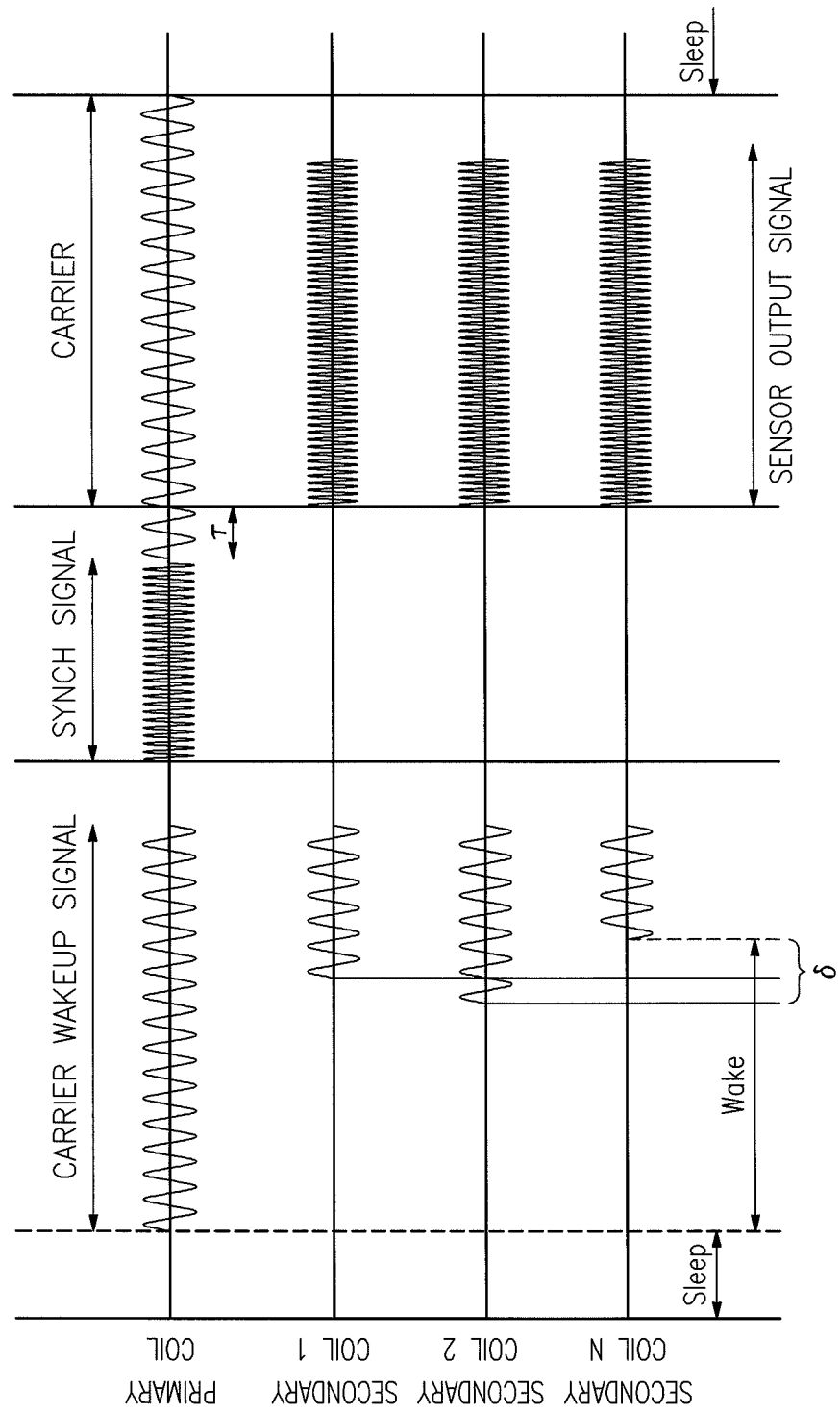
FIG. 4 is a graphic illustration of signals generated by the wireless monitoring system.

The magnetic field 46 energizes one or more of the secondary coils 74. As shown in FIG. 4, the secondary coils 74 are typically energized (or woken) at different times depending on sensor transducer degradation, field interference, etc. Each energized secondary coil 74 reproduces the carrier signal within the sensor transducer 44 by converting the carrier signal from a magnetic signal to an electrical signal.

Referring to FIG. 3, the reproduced carrier signal is converted from alternating current ("AC") to direct current ("DC") as it passes through the rectifier 84. The DC carrier signal is used to power the microcontroller 86 and the sensor 78. Power from the DC carrier signal can also be stored within the power storage device 80. The stored power can then be used to boost the power provided to the microcontroller 86 and/or the sensor 78.

The sensor 78 measures the parameter within the internal blade compartment 22, 38 (see FIGS. 1 and 2), and generates the corresponding sensor output signal. The sensor 78 provides the sensor output signal to the microcontroller 86.

In embodiments where the monitoring system 40 includes a single sensor transducer 44, the microcontroller 86 processes the sensor output signal in order to generate the sensor transducer output signal. The sensor transducer output signal is generated by modulating the reproduced carrier signal using the load modulation circuit 82. The sensor transducer output signal is transmitted through the magnetic field 46 to the base transducer 42 using the secondary coil 74.

In contrast, when the monitoring system 40 includes a plurality of the sensor transducers 44 as shown in FIG. 3, the base transducer 42 provides the synch signal (see FIG. 4) to the sensor transducers 44 before transmission of the sensor transducer output signals. The synch signal is used by the microcontrollers 86 such that the sensor transducer output signals are synchronized and transmitted according to, for example, a Code Division Multiple Access (or CDMA) standard. Referring to FIG. 4, the synch signal is generated by altering the carrier signal to having a second frequency using the modulator 59. The synch signal is transmitted through the magnetic field 46 to the sensor transducers 44 (see FIG. 3) using the primary coil 48. The modulator 59 returns the carrier signal to first frequency after a predetermined synchronization period, thereby terminating the synch signal and creating a time stamp.

Referring to FIG. 3, the sensor transducers 44 generate and transmit the sensor transducer output signals as a function of the synch signal. Each sensor transducer 44 generates, for example, its respective sensor transducer output signal with a unique pseudorandom code to facilitate orthogonal transmission of the multiple output signals. Referring to FIG. 4, the sensor transducer output signals are then synchronously transmitted a fixed period of time τ after the time stamp (i.e., the termination of the synch signal). Alternatively, different groups of sensor transducers can transmit their sensor transducer output signals at different times using time division multiplexing. A first group of the sensor transducers, for example, can synchronously transmit their sensor transducer output signals a first fixed period of time after the time stamp. A second group of the sensor transducers can synchronously transmit their sensor transducer output signals a second fixed period of time after the time stamp, where the first and the second periods of time are different.

Referring to FIG. 3, the base transducer 42 receives the sensor transducer output signals via the primary coil 48. The microcontroller 60 generates the sensor data by processing (e.g., demodulates, decodes, etc.) the received output signals.

The sensor data can be provided to, for example, a high-level controller to improve engine performance, a Diagnostics, Prognostics and Health Management (or DPHM) system, and/or a Condition Based Maintenance (or CBM) system.

Referring to the embodiment shown in FIG. 4, the base transducer 42 can terminate the carrier signal upon receiving the sensor transducer output signals from the sensor transducers 44. Each sensor transducer 44 is subsequently de-energized until the base transducer 42 generates another wakeup signal.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A method for wirelessly monitoring an aircraft propulsion system, comprising:
   providing a plurality of rotor blades for the aircraft propulsion system, at least some of which rotor blades have an internal compartment;
   providing a primary transducer having a primary coil, and a plurality of secondary transducers, each secondary transducer having a secondary coil connected to a sensor, wherein the secondary transducers are respectively disposed within the internal compartments;
   wirelessly powering the secondary transducers using a magnetic field generated by the primary transducer;
   monitoring at least one operational parameter from within each internal compartment using a respective sensor;
   transmitting a synchronization signal from the primary transducer to the secondary transducers through the magnetic field; and
   transmitting output signals from the secondary transducers to the primary transducer through the magnetic field as a function of the synchronization signal, wherein the output signals are indicative of the monitored parameters.

2. The method of claim 1, further comprising generating each output signal with a unique pseudorandom code.

3. The method of claim 1, further comprising generating the output signals according to a Code Division Multiple Access standard.

4. The method of claim 1, wherein the synchronization signal provides a time stamp, and wherein the output signals are synchronously transmitted a fixed period of time after the time stamp.

5. The method of claim 1, wherein the output signals are transmitted using time division multiplexing.

6. A gas turbine engine, comprising:
   a rotor stage including a plurality of rotors, at least one of the rotors including a blade with an internal compartment;
   an enclosure disposed circumferentially around the rotor stage;
   a primary transducer having a primary coil disposed with the enclosure; and
   a secondary transducer having a secondary coil connected to a sensor, which secondary transducer is disposed within the internal compartment of the blade;
   wherein the primary transducer is operable to wirelessly transfer power to the secondary transducer, and wherein the secondary transducer is operable to wirelessly transfer sensor data to the primary transducer.

7. The engine of claim 6, wherein:
the rotor stage is configured in a fan section of the engine; and
the enclosure comprises a fan case.

8. The engine of claim 6, wherein the primary coil extends circumferentially around the rotor stage, and wherein the primary coil is connected to an outer surface of the enclosure.

9. The engine of claim 6, wherein the primary coil extends circumferentially around the rotor stage, and wherein the primary coil is embedded within the enclosure.

10. The engine of claim 6, further comprising a plurality of the secondary transducers, wherein a plurality of the rotors include blades with internal compartments, and wherein each secondary transducer is disposed within a respective one of the internal compartments.

11. The engine of claim 6, wherein the secondary transducer includes a power storage device.

12. The engine of claim 6, wherein the sensor comprises one of a strain sensor, a pressure sensor and a temperature sensor.

13. The engine of claim 6, wherein
the primary transducer is operable to wirelessly transfer power to the secondary transducer through a magnetic field; and
the secondary transducer is operable to wirelessly transfer sensor data to the primary transducer through the magnetic field.

14. A rotary wing aircraft, comprising:
an enclosure;
a mast extending from the enclosure to a plurality of rotors, at least one of the rotors having a blade with an internal compartment;
a primary transducer having a primary coil disposed with the enclosure; and
a secondary transducer having a secondary coil connected to a sensor, which secondary transducer is disposed within the internal compartment of the blade;
wherein the primary transducer is operable to wirelessly transfer power to the secondary transducer, and wherein the secondary transducer is operable to wirelessly transfer sensor data to the primary transducer.

15. The aircraft of claim 14, wherein the enclosure comprises one of an engine cowling and a cabin ceiling.

16. The aircraft of claim 14, wherein the primary coil extends circumferentially around a rotational axis of the mast, and wherein the primary coil is connected to a surface of the enclosure.

17. The aircraft of claim 14, wherein the primary coil extends circumferentially around a rotational axis of the mast, and wherein the primary coil is embedded within the enclosure.

18. The aircraft of claim 14, further comprising a plurality of the secondary transducers, wherein each of the rotors includes a blade with an internal compartment, and wherein each secondary transducer is disposed within a respective one of the internal compartments.

19. The aircraft of claim 14, wherein the secondary transducer includes a power storage device.

20. The aircraft of claim 14, wherein the sensor comprises one of a strain sensor, a pressure sensor and a temperature sensor.

21. The aircraft of claim 14, wherein
the primary transducer is operable to wirelessly transfer power to the secondary transducer through a magnetic field; and
the secondary transducer is operable to wirelessly transfer sensor data to the primary transducer through the magnetic field.

* * * * *